United States Patent
Rostaing (10) Patent No.: US 9,329,283 B2
(45) Date of Patent: May 3, 2016

(54) SEMICONDUCTOR-DETECTOR-BASED METHOD AND DEVICE FOR DETECTING IONISING RADIATION

(71) Applicant: Commissariat A L'Energie Atomique Et Aux Energies Alternatives, Paris (FR)

(72) Inventor: Jean-Pierre Rostaing, La Côte Saint-Andre (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 14/653,355

(22) PCT Filed: Dec. 23, 2013

(86) PCT No.: PCT/FR2013/053252
§ 371 (c)(1),
(2) Date: Jun. 18, 2015

(87) PCT Pub. No.: WO2014/096746
PCT Pub. Date: Jun. 26, 2014

(65) Prior Publication Data
US 2015/0323686 A1 Nov. 12, 2015

(30) Foreign Application Priority Data
Dec. 21, 2012 (FR) ...................................... 12 62576

(51) Int. Cl.
*G01T 1/29* (2006.01)
*G01T 1/24* (2006.01)

(52) U.S. Cl.
CPC .................. *G01T 1/247* (2013.01); *G01T 1/241* (2013.01)

(58) Field of Classification Search
CPC ....... G01T 1/2928; G01T 1/24; G01T 1/1647; H01L 31/115; H01L 31/00
See application file for complete search history.

(56) References Cited

U.S. PATENT DOCUMENTS

| 2005/0139777 A1 | 6/2005 | Rostaing et al. |
| 2007/0029494 A1 | 2/2007 | Caruba et al. |
| 2013/0168562 A1* | 7/2013 | Brambilla ............... G06T 1/241 250/371.01 |

FOREIGN PATENT DOCUMENTS

| WO | 0127656 A1 | 4/2001 |
| WO | 03071787 A1 | 8/2003 |

OTHER PUBLICATIONS
International Search Report filed in PCT/FR2013/053252, dated Apr. 7, 2014, 2 pages.
(Continued)

*Primary Examiner* — David Porta
*Assistant Examiner* — Mamadou Faye
(74) *Attorney, Agent, or Firm* — Vedder Price, P.C.

(57) ABSTRACT

A device for detecting ionizing radiation results in charges forming in a sensor covered with a plurality of electrodes that are each connected to an electronic circuit adapted to deliver, to a processing module, a first signal indicating when charge has been collected by the electrode connected to said circuit. Each central circuit is adapted, when a central electrode has collected charge, to determine a possible detection overlap with one of the adjacent electrodes; to determine a priority detection overlap with an adjacent priority circuit; to transmit or receive to/from the adjacent priority circuit a request to participate in a detection overlap and to receive or transmit from/to the adjacent priority circuit an indication of availability; and to transmit said first signal except in the case where an availability indication has been transmitted to the adjacent priority circuit.

13 Claims, 6 Drawing Sheets

(56) References Cited

OTHER PUBLICATIONS

"Investigation of the Small Pixel Effect in CdZnTe Detectors"; M.D. Wilson, P. Seller, M.C. Veal & P.J. Sellin; 2007 IEEE Nuclear Science Symposium Conference Record; pp. 1255-1259.

"Spectroscopic X-Ray Imaging With Photon Counting Pixel Detectors"; L. Tlustos, Nuclear Instruments and Methods in Physics Research A; pp. 1-6.

"Characterization of M-π-n. CdTe Pixel Detectors Coupled to HEXITEC Readout Chip", M.C. Veal, J. Kalliopuska, H. Pohjonen, H. Andersson, S. Nenonen, P. Seller and M.D. Wilson; 13th International Workshop on Radiation Imaging Detectors, 2011; pp. 1-10.

English Translation of the Written Opinion of the International Searching Authority for International Application No. PCT/FR2013/053252, 7 pages.

\* cited by examiner

SEMICONDUCTOR-DETECTOR-BASED METHOD AND DEVICE FOR DETECTING IONISING RADIATION

BACKGROUND

The present invention relates to an ionizing radiation detection method and to a device using a semiconductor detector.

STATE OF THE ART

In an ionizing radiation detection device using a detector made of a semiconductor material, photons cause the forming of charges in the semiconductor material, which are collected by electrodes, distributed on a surface of the detector. Each electrode is connected to a read circuit, which generally outputs at least two signals based on the charges collected by the electrode: a binary signal which is representative of the detection of a photon and an analog signal representative of the energy level of the detected photon. The signals are transmitted to a computer which may, based on the number of detected photons and on their energy levels, determine certain properties of the object or of the living organism crossed by the ionizing radiation.

In certain cases, the charges created by a photon may distribute between two adjacent electrodes. Such a phenomenon is called charge sharing. Each read circuit connected to one of these electrodes then indicates that it has detected a photon and provides an energy level according to the quantity of charges collected by the associated electrode. It is thus necessary to provide correction means to avoid counting too high a number of photons and to assign a proper energy level to each detected photon. Correction methods are generally implemented by the computer, which analyzes the signals output by the read circuits.

It would however be desirable for the correction steps to be directly carried out at the level of the read circuits.

SUMMARY

An object of an embodiment of the present invention is to provide a detection method and device overcoming all or part of the disadvantages of prior art.

Another object of an embodiment of the present invention is to provide an ionizing radiation detection method and device using a detector made of a semiconductor material where the correction of the detection of charge sharing phenomena is directly performed at the level of the read circuits.

Another object of an embodiment of the present invention is for the read circuits to be identical electronic circuits.

Another object of an embodiment of the present invention is not to disturb the operation of the read circuits even if many charge sharing phenomena occur simultaneously.

To achieve this, an embodiment provides a device for detecting an ionizing radiation comprising a sensor wherein the ionizing radiation causes the forming of charges, the sensor being covered with a plurality of electrodes, each connected to an electronic circuit capable of supplying a processing unit with a first signal indicating that charges are being collected by the electrode connected to said electronic circuit;

wherein at least one electrode, called central electrode, is surrounded with at least two electrodes, called adjacent electrodes, the circuit connected to the central electrode, called central circuit, being capable of exchanging signals with each of the circuits connected to the adjacent electrodes, called adjacent circuits;

wherein each central or adjacent circuit is capable of respectively sending to the adjacent or central circuit a second detection signal when charges are being respectively collected on the central electrode or an adjacent electrode;

wherein each central or adjacent circuit is capable of respectively sending to the adjacent or central circuit a request to participate in a detection overlap and respectively receiving from the adjacent or central circuit an availability indication;

wherein each central circuit comprises an analysis and control device, capable of, when the central electrode has collected charges:

(a) determining, within a time range, a possible detection overlap between the central electrode and at least one of the adjacent electrodes based on the detection signals;

(b) in the case of a detection overlap, determining a first priority detection overlap with an adjacent circuit, called priority circuit, for which the second detection signals of the priority adjacent circuit and of the central circuit have the highest probability of corresponding to a same received photon;

(c) transmitting to or receiving from the priority adjacent circuit a request to participate in a detection overlap and receiving from or transmitting to the priority adjacent circuit an availability indication; and (d) transmitting said first signal to the processing unit except in the case where a detection overlap has been determined within said time range and where an availability indication has been sent to the priority adjacent circuit.

According to an embodiment, the analysis and control device of each central circuit is capable, in the case of the determination of at least two detection overlaps, of determining the priority adjacent circuit from among the adjacent circuits having taken part in the detection overlaps.

According to an embodiment, each circuit is capable of transmitting to the processing unit a third signal representative of the energy of the ionizing radiation having caused the forming of the charges collected by the electrode connected to said circuit, the analysis and control device of each central circuit being capable of supplying the processing unit, if said priority adjacent circuit accepts the participation request, with the third signal from the central circuit increased by the third signal from the priority adjacent circuit.

According to an embodiment, the analysis and control device of each central circuit is capable of transmitting to the priority adjacent circuit the third signal from the central circuit when an availability indication has been sent to the priority adjacent circuit.

According to an embodiment, at least certain central electrodes are each surrounded with at least four adjacent electrodes.

According to an embodiment, each electronic circuit is capable of providing a fourth analog signal which transits through an extremum when charges are being collected by the electrode connected to said electronic circuit, the second signal being different from the first signal and being a binary signal which switches state when the fourth signal is greater, in absolute value, than a threshold.

According to an embodiment, each electronic circuit is capable of outputting the first signal, which has a leading edge subsequent to the trailing edge of the second signal.

According to an embodiment, the analysis and control device of each central circuit is capable of determining the priority adjacent circuit, which is that of the adjacent circuits connected to adjacent electrodes having collected charges in said time range which outputs the second signal having its leading edge most closely following the leading edge of the second signal output by the central circuit.

According to an embodiment, each electronic circuit is capable of outputting a fifth binary signal of constant duration, different from the first signal and from the second signal, indicating that charges are being collected by the electrode connected to said electronic circuit, each central circuit being capable of transmitting, to each adjacent circuit, the fifth signal output by the central circuit and of receiving, from each adjacent circuit, the fifth signal output by each adjacent circuit.

According to an embodiment, the central circuit is capable of determining whether the logical product of the fifth signal output by the central circuit and of the fifth signal output by each adjacent circuit changes value.

According to an embodiment, each electronic circuit is capable of outputting the fifth signal having its leading edge overlapping the leading edge of the second signal.

According to an embodiment, the electronic circuits are identical.

According to an embodiment, the analysis and control device of each central circuit is capable, when the central electrode has collected charges, of determining at least two priority adjacent circuits.

According to an embodiment, the ionizing radiation causes the forming of charges in a sensor, the sensor being covered with a plurality of electrodes, each connected to an electronic circuit capable of supplying a processing unit with a first signal indicating that charges are being collected by the electrode connected to said electronic circuit, each central circuit comprising an analysis and control device;

wherein at least one electrode, called central electrode, is surrounded with at least two electrodes, called adjacent electrodes, the circuit connected to the central electrode, called central circuit, being capable of exchanging signals with each of the circuits connected to the adjacent electrodes, called adjacent circuits;

wherein each central or adjacent circuit is capable of respectively sending to the adjacent or central circuit a second detection signal when charges are respectively collected on the central electrode or an adjacent electrode;

wherein each central or adjacent circuit is capable of respectively sending to the adjacent or central circuit a request to participate to a detection overlap and respectively receiving from the adjacent or central circuit an availability indication;

the method comprising, for the analysis and control circuit of each central circuit, when the central electrode has collected charges, the steps of:

(a) determining, within a time range, a possible detection overlap between the central electrode and at least one of the adjacent electrodes based on the detection signals;

(b) in the case of a detection overlap, determining a first priority detection overlap with an adjacent circuit, called priority circuit, for which the second detection signals of the priority adjacent circuit and of the central circuit have the highest probability of corresponding to a same received photon;

(c) transmitting to or receiving from the priority adjacent circuit a request for taking part in a detection overlap and receiving from or transmitting to the priority adjacent circuit an availability indication; and (d) transmitting said first signal to the processing unit except in the case where a detection overlap has been determined within said time range and where an availability indication has been sent to the priority adjacent circuit.

BRIEF DESCRIPTION OF THE DRAWINGS

The foregoing and other features and advantages will be discussed in detail in the following non-limiting description of specific embodiments in connection with the accompanying drawings, among which.

(a) FIG. 1 partially and schematically shows an example of an ionizing radiation detection device.

(b) FIG. 2 schematically shows a portion of a read circuit of the device shown in FIG. 1.

(d) FIG. 4 schematically shows an embodiment of an ionizing radiation detection device according to the invention.

(e) FIG. 5 partially and schematically shows an example of layout of the correction circuits of the device of FIG. 4.

(g) FIG. 7 schematically shows an embodiment of a portion of the correction circuit of FIG. 4.

For clarity, the same elements have been designated with the same reference numerals in the different drawings.

DETAILED DESCRIPTION

In the following description, binary signal means a signal capable of having two stable states, a first state called low state or '0' and a second called high state or '1'. Further, unless otherwise mentioned, a signal is called active when it is at state '1' and inactive when it is at state '0'.

Figure 1:
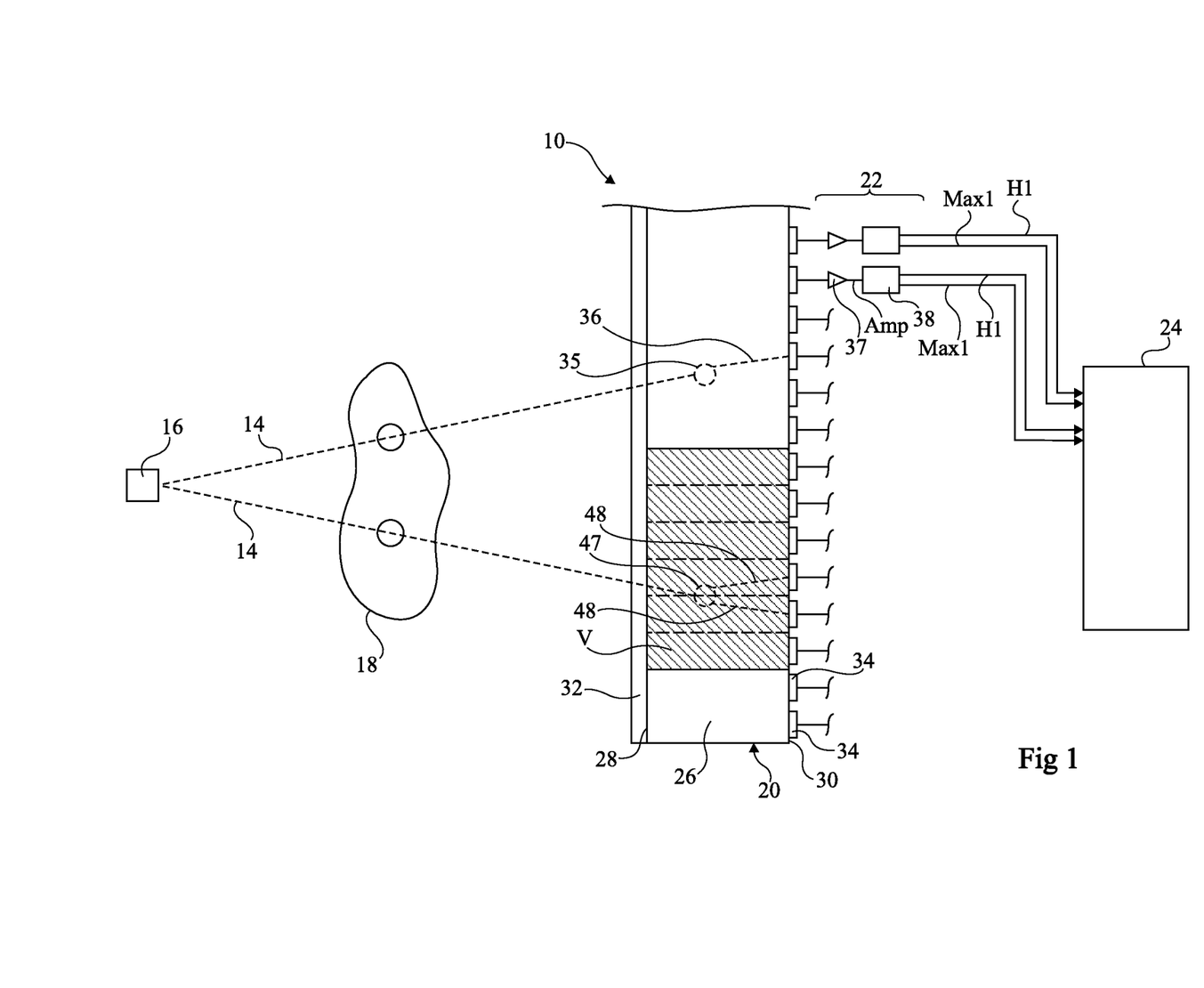

FIG. 1 shows an example of a device 10 for detecting an ionizing radiation 14, emitted by an ionizing radiation source 16 and having crossed an object or living organism 18. Device 10 comprises an ionizing radiation sensor 20 made of a semiconductor material, electronic read circuits 22 capable of outputting signals representative of the detection of photons by sensor 20, and a processing unit 24 receiving the signals output by read circuits 22. Only two read circuits are shown in FIG. 1.

An example of application of an ionizing radiation detection device is the non-destructive control of materials, the search for hazardous or illegal substances, for example, in luggage. Another application may be medicine and the observation of living organisms. Such ionizing radiation detection devices allow an imaging of the objects or living organisms to be controlled.

Sensor 20 comprises a wafer 26 of a semiconductor material, preferably single-crystal, of generally parallel epi-pedal shape having two main surfaces 28, 30, generally opposite and parallel. In imaging applications, semiconductor material wafer 26 generally has a thickness in the range from a few hundred micrometers to a few millimeters, or even a few centimeters, and a surface area of a few square centimeters or even of a few tens of square centimeters.

The semiconductor material may be cadmium zinc telluride (CdZnTe), cadmium telluride (CdTe), mercury iodide ($HgI_2$), gallium arsenide (GaAs), silicon (Si). Ionizing radiation 14 may comprise alpha, beta, X, gamma rays, or even neutrons. Although neutrons do not directly form an ionizing radiation, they induce ionizing radiations by the particles created during their interaction with matter.

Surface 28 is covered with one or a plurality of electrodes 32 called cathodes and the other surface 30 is covered with one or a plurality of electrodes 34 called anodes. Each electrode 34 is connected to one of read circuits 22. In operation, ionizing radiations 14 of sufficient energy interact with the semiconductor material to create electron/hole pairs. FIG. 1 schematically shows by a dotted circle 35 an example of interaction and by a dotted line 36 the travel of electrons all the way to an electrode 34. Electrodes 32, 34 are used to bias wafer 26 to allow the migration of electrons and holes towards electrodes 32, 34. In most previously-mentioned usual semiconductor materials, the potential applied to the anodes, for example, the ground potential, is greater than the potential applied to the cathodes, for example, a negative potential. The electrons are then collected by anodes 34, which is why the latter are connected to read circuits 22. Cathodes 32 generally have a role limited to the biasing of wafer 26 and a single cathode may be used, as shown in FIG. 1.

A plurality of anodes 34 having, for example, the shape of pads insulated from one another and arranged in an array, in rows and columns, are generally used. When a bias voltage is applied between cathode 32 and anodes 34, an electric field appears in the semiconductor material. This electric field drives holes towards cathode 32 and electrons towards anodes 34. Each anode 34 cooperates with a volume V of semiconductor material opposite thereto, and which is shown by a hatched area in FIG. 1. Each volume V corresponds to a pixel of detection device 10.

During an interaction of the semiconductor material with an incident ionizing radiation 14, the electron-type charges generated in volume V of semiconductor material opposite an anode 34 are collected by this anode. These charges collected by an anode induce an electric current pulse. Read circuit 22 comprises a charge preamplifier 37 supplying a signal Amp to a shaping circuit 38 which supplies signals H1 and Max1 to processing unit 24.

Figure 2:
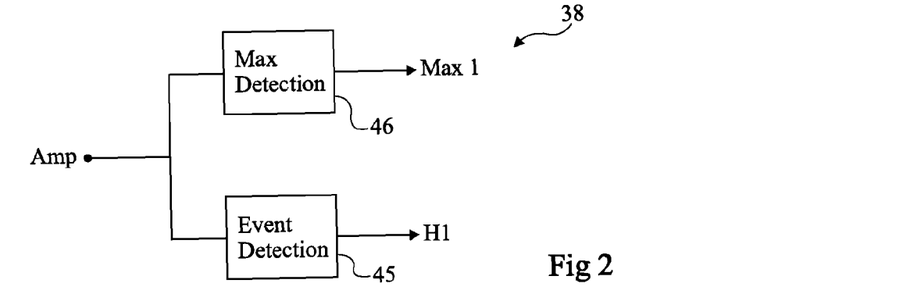
Figure 3:
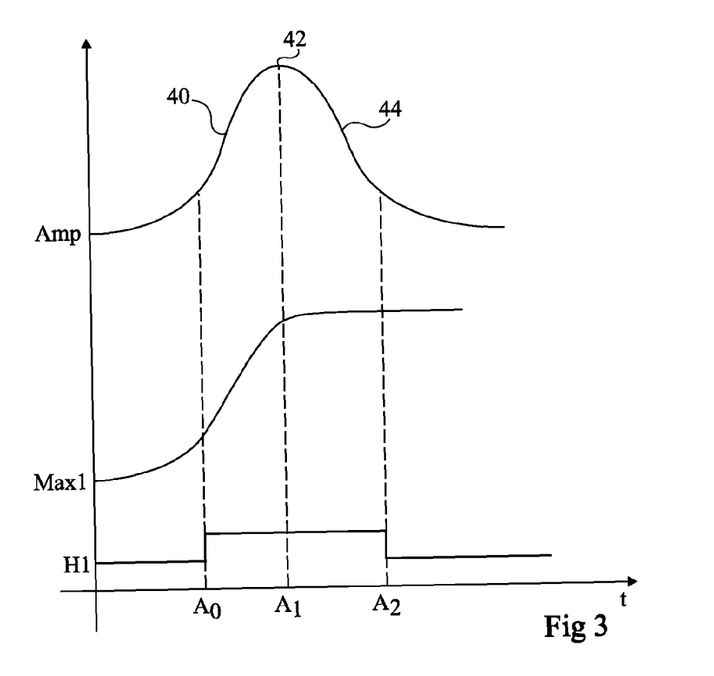
FIG. 3 is a timing diagram of signals output by the read circuit of FIG. 2.

FIG. 2 shows an embodiment of shaping circuit 38 and FIG. 3 shows timing diagrams illustrating examples of the variation of the signal received and of the signals output by shaping circuit 38. Times $A_0$, $A_1$, and $A_2$ are successive times.

Shaping circuit 38 receives analog signal Amp output by charge preamplifier 37. Signal Amp is obtained from the current pulse during the charge collection by electrode 34 connected to read circuit 22. When charges are being collected by electrode 34, this causes a variation of signal Amp, which generally comprises a growth phase 40, the transition through a maximum value 42 at time $A_1$, and a decrease phase 44.

Shaping circuit 38 comprises an event detection unit 45 (Event Detection) which receives signal Amp and which outputs signal H1. Signal H1 is a binary signal which is in a first state, for example, '0', as long as signal Amp is lower than a threshold and is in a second state, for example, '1', when signal Amp is greater than the threshold. In the example illustrated in FIG. 3, binary signal $H_1$ switches from '0' to '1' at time $A_0$ and from '1' to '0' at time $A_2$.

Shaping circuit 38 further comprises a maximum detection unit 46 (Max Detection) which receives signal Amp and which outputs an analog signal Max1. Analog signal Max1 follows signal Amp in growth phase 40 and keeps the maximum value of signal Amp after time $A_1$. This maximum value is representative of the energy of the ionizing radiation deposited in volume V of semiconductor material opposite anode 34.

During the use of ionizing radiation detection device 10 for imaging, an image of object or living organism 18 placed between ionizing radiation source 16 and detection device 10 is desired to be obtained. Ionizing radiation 14 which crosses object or living organism 18 is attenuated at the time when it reaches sensor 20. The intensity of ionizing radiation 14 which reaches sensor 20 depends on the chemical composition and on the density of the crossed object or living organism 18. Processing unit 24 may, based on signals H1 and Max1, output an image of the transmission contrast of object or living organism 18, which enables to acquire information relative to the internal structure of object or living organism 18.

To form images of the observed object or living organism 18 with a correct quality, it is necessary to have a large number of pixels and thus a large number of electrodes 34 which are each connected to a read circuit 22. Now, electrodes 34 appear to collect spurious signals which should be rejected if the desired quality is desired to be obtained.

Spurious signals may occur in the case of a charge sharing which occurs when the charges formed due to the interaction of a photon with the semiconductor material are collected by two electrodes 34 associated with two neighboring pixels. FIG. 1 schematically shows by a dotted circle 47 an example of interaction causing a charge sharing and by dotted lines 48 the travel of electrons all the way to two adjacent electrodes 34.

Processing unit 24 can, based on an analysis of signals H1 and Max1 output by each read circuit 22, determine whether charge sharing has occurred and, if so, correct the number and the energy level of the detected photons. Indeed, when charges are almost simultaneously detected by two read circuits connected to adjacent pixels, which is called detection overlap hereafter, this mostly corresponds to cases with a single photon having interacted with the semiconductor material, and having caused the forming of electrons collected by two adjacent electrodes. However, this imposes for processing unit 24 to precisely date all event signals H1 output by read circuits 22 in order to determine whether event signals H1 output by read circuits 22 of adjacent pixels are simultaneous. When the number of pixels is high, such a dating operation may be difficult to perform at a low cost in real time.

It would thus be desirable to be able to perform the correction while taking into account charge sharing directly at the level of read circuits 22 associated with the pixels. Processing unit 24 then no longer has to perform the correction operation to take into account charge sharing. Advantageously, processing unit 24 may no longer have to date all the signals which are transmitted thereto by the read circuits.

Figure 4:
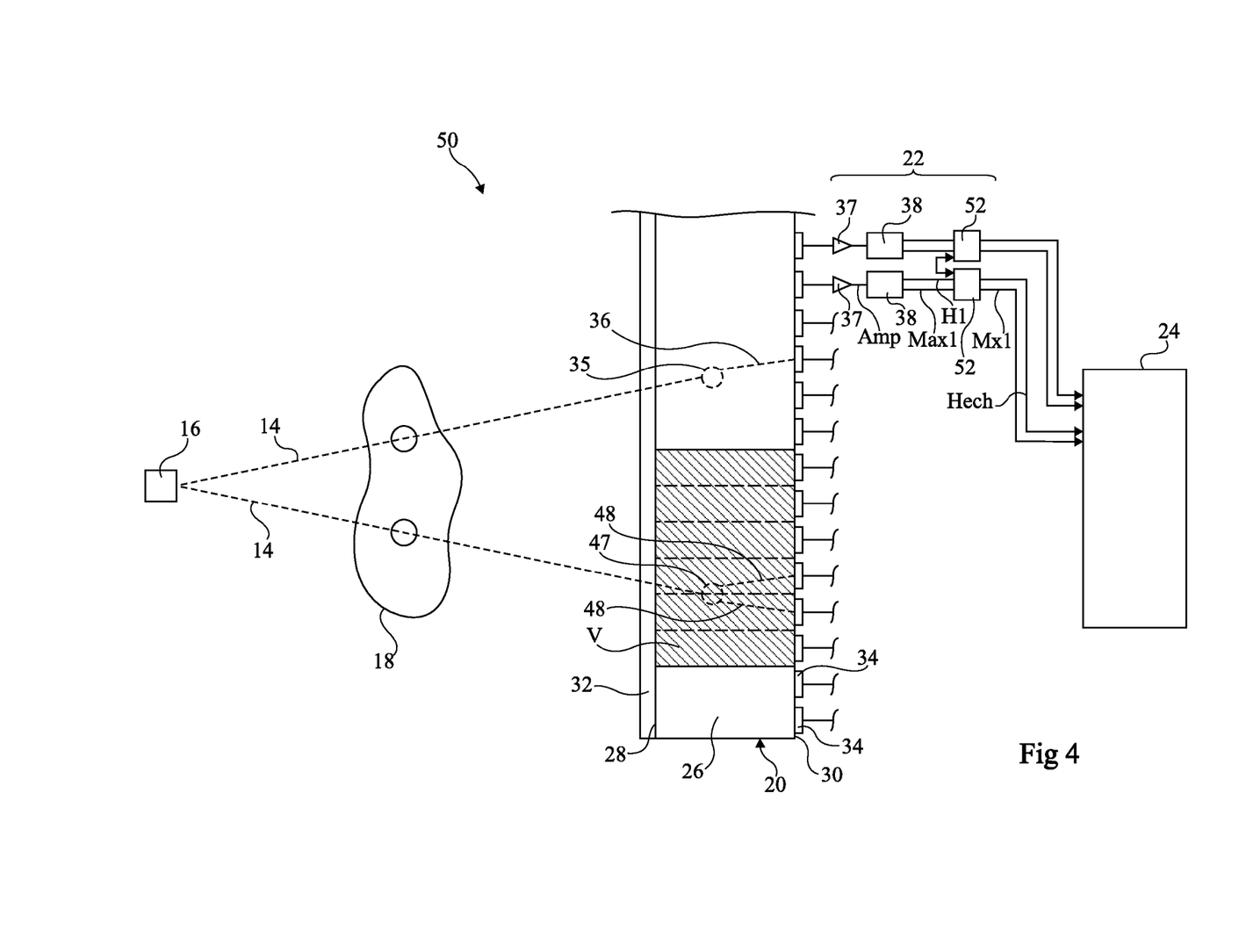

FIG. 4 shows an embodiment according to the invention of an ionizing radiation detection device 50. Device 50 comprises all the elements of device 10 shown in FIG. 1. However, read circuit 22 associated with each pixel V further comprises a correction circuit 52 which receives signals H1 and Max1 output by shaping circuit 38 and which supplies signals Mx1 and Hech to processing unit 24. Signal Hech is a binary signal which is, for example, set to '1' to indicate the detection of an ionizing radiation by the correction circuit. Signal Hech may be set to '1' for a constant time period. Signal Mx1 is an analog signal representative of the energy of the photon detected by the pixel connected to the correction circuit. Further, each correction circuit 52 associated with a given pixel may exchange signals with correction circuits 52 associated with pixels adjacent to the given pixel. Correction circuit 52 may further receive and output other signals.

Figure 5:
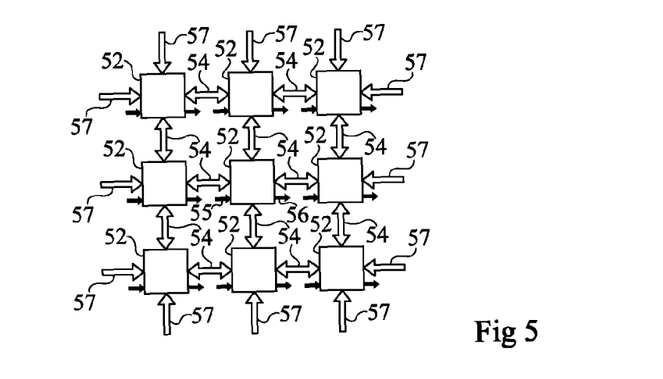

FIG. 5 illustrates an example of connection between correction circuits 52. As an example, in the case where electrodes 34 are distributed in an array, in rows and columns, correction circuits 52 may be arranged similarly. FIG. 5 schematically shows an array of nine correction circuits 52 arranged in three rows and three columns. Of course, in practice, the number of rows and of columns is high. As an example, the correction circuit connected to a central electrode surrounded with eight electrodes may exchange signals with the correction circuits connected to the electrodes respectively located to the north, to the south, to the east, and to the west of the central electrode (double arrow 54). Each correction circuit 52 further receives signals from shaping circuit 38 (arrow 55) and supplies processing circuit 24 with signals (arrow 56). In the following description, the correction circuit connected to the central electrode is called central correction circuit and the correction circuits connected to electrodes located to the north, to the south, to the east, and to the west of the central electrode are called adjacent correction circuits.

Preferably, correction circuits 52 are identical electronic circuits. To achieve this, correction circuits 52 connected to electrodes 34 at the border of the electrode array however receive signals (arrows 57) set to an inactive state.

In the following description, for clarity, for at least certain signals received and transmitted by the central correction circuit, index k capable of being equal to N, S, E or O is added when the signal is exchanged with the adjacent correction circuit connected to electrode 34 respectively located to the north, to the south, to the east, and to the west of the central electrode.

According to an embodiment of the invention, central correction circuit 52 receives at least signals $H_k$ and $Mx_k$ from each adjacent correction circuit 52 and supplies signals $H1_k$ and Mid to each adjacent correction circuit 52. Signal $H1_k$ is identical to signal H1 received by the central correction circuit. Signal $H_k$ is identical to signal H1 received by each adjacent correction circuit. Signal Mid is an analog signal which at least partly follows signal Max1.

Figure 6:
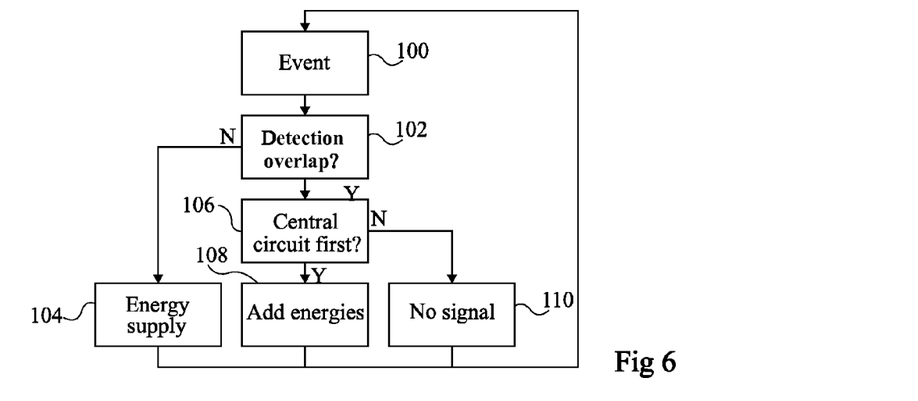
FIG. 6 shows, in the form of a block diagram, an embodiment of a correction method according to the invention.

FIG. 6 illustrates in the form of a block diagram an embodiment of a correction method implemented by central correction circuit 52.

At step 100, central correction circuit 52 detects an ionizing radiation. This for example corresponds to the reception of a signal H1 transiting through state '1'. The method carries on at step 102.

At step 102, central correction circuit 52 determines whether an ionizing radiation has been detected in substantially overlapping fashion by one of the adjacent correction circuits by detecting, in particular, whether one of signals $H_k$ switches state. According to an embodiment of the invention, the central correction circuit considers that a detection overlap with an adjacent correction circuit is occurring if signal $H_k$ switches state within a given time interval before or after the state switching of signal H1 received by the central correction circuit.

According to an embodiment of the invention, the central correction circuit takes into account a single detection overlap, called priority detection overlap. If a single detection overlap occurs, this detection overlap is the priority detection overlap. If two or three detection overlaps with adjacent correction circuits occur, the central correction circuit selects the priority detection overlap and ignores the other detection overlaps.

If there is no detection overlap at step 102, the method caries on at 104. If a detection overlap occurs between two adjacent pixels, the method carries on at step 106.

At step 104, the central correction circuit sets signal Hech to '1' to indicate the detection of an ionizing radiation by the central pixel. As an example, the rising edge of signal Hech occurs after the falling edge of signal H1. Signal Mx1 supplied to processing unit 24 while signal Hech is at state '1' is an analog signal having a substantially constant value and corresponding to the maximum value of signal Max1. The method carries on at step 100.

At step 106, it is determined which of the two pixels taking part in the priority overlap detection should be assigned the ionizing radiation detection, that is, which of the two correction circuits, between the central correction circuit and the adjacent correction circuit, will transmit signals Hech and Mx1 to processing unit 24. If it is determined that the ionizing radiation detection is assigned to the central pixel, the method carries on at step 108. If it is determined that the ionizing radiation detection is assigned to the adjacent pixel, the method carries on at step 110. According to an embodiment of the invention, the ionizing radiation detection is assigned to the correction circuit for which signal H1 switches first to state '1'.

At step 108, the central correction circuit sends a request to the adjacent correction circuit participating in the priority detection overlap to obtain the value representative of the energy of the photon detected by the adjacent correction circuit. If the request is accepted, the adjacent correction circuit transmits this energy value via signal $Mx_k$. Further, the correction circuit sets signal Hech to '1' to indicate the detection of an ionizing radiation by the central pixel. As an example, the rising edge of signal Hech occurs after the falling edge which occurs last between that of signal $H_k$ and of signal H1 received by the central correction circuit.

If the request has been accepted, signal Mx1 supplied by central correction circuit 52 to processing unit 24 while signal Hech is at state '1' is an analog signal having a substantially constant value and corresponding to the sum of the maximum values of signals Max1 received by the central and adjacent correction circuits. If the request has been rejected, signal Mx1 supplied by the central correction circuit to processing unit 24 while signal Hech is at state '1' is an analog signal having a substantially constant value and corresponding to the sum of the maximum value of signals Max1 received by the central correction circuit only. The method carries on at step 100.

At step 110, the central correction circuit transmits to the adjacent correction circuit participating in the priority detection overlap, via signal Mid, a value representative of the energy of the photon that it has detected. Further, the central correction circuit maintains signal Hech at '0'. Processing unit 24 thus considers that there has been no ionizing radiation detection by the central pixel. The method carries on at step 100.

According to the embodiment previously described in relation with FIG. 6, the signals representative of energy levels Max1, Mx1, Mid, and $Mx_k$ are analog signals. According to another embodiment, the signals exchanged between the correction circuits and representative of energy levels may be digital signals. According to an example, analog signal Amp output by charge preamplifier 37 is converted into a digital signal AmpNUM and all signals Max1, Mx1, Mid, and $Mx_k$ representative of energy levels are obtained from signal AmpNUM. According to another example, analog signals Max1, Mx1, Mid, and $Mx_k$ or some of them may be determined from signal Amp and be converted into digital signals when they have to be exchanged between correction circuits.

According to the embodiment previously described in relation with FIG. 6, the central correction circuit only takes into account a single priority detection overlap among all detection overlaps. According to another embodiment, at step 102, the central correction circuit may take into account a plurality of detection overlaps, or even all the detection overlaps, called priority detection overlaps, among all the detection overlaps. In this case, at step 106, it may be determined which of the pixels taking part in the priority detection overlaps should be assigned the ionizing radiation detection, that is, which of the correction circuits, between the central correction circuit and the adjacent correction circuits participating in the priority detection overlaps, will transmit signals Hech and Mx1 to processing unit 24. If it is determined that the ionizing radiation detection is assigned to the central pixel, the central correction circuit may send, at step 108, a request to each adjacent correction circuit taking part in the priority detection overlaps to obtain the value representative of the energy of the photon detected by this adjacent correction circuit. Each adjacent correction circuit accepting the request can transmit this energy value via signal $Mx_k$. If it is determined that the ionizing radiation detection is assigned to one of the adjacent pixels, the central correction circuit may transmit, at step 110, to the adjacent correction circuit to which the ionizing radiation detection is assigned, a value representative of the energy of the photon that it has detected and the central correction circuit maintains signal Hech at '0'.

According to an embodiment of the invention, the central correction circuit further receives a signal $Gn_k$ from each adjacent correction circuit and supplies each adjacent correction circuit with a signal Gn1. Signals $Gn_k$ and Gn1 are reference potentials or local grounds.

The fact for the setting to '1' of signal Hech to be performed by a single circuit, the central correction circuit or the adjacent correction circuit, in the case of a overlap of charge detection by two contiguous electrodes, enables to improve the taking into account of detection overlaps by processing unit 24. Further, the fact that the circuit setting to '1' signal Hech also outputs a signal Mx1 representative of the sum of the energies detected by two contiguous electrodes enables to still further improve the taking into account of detection overlaps by processing unit 24.

Figure 7:
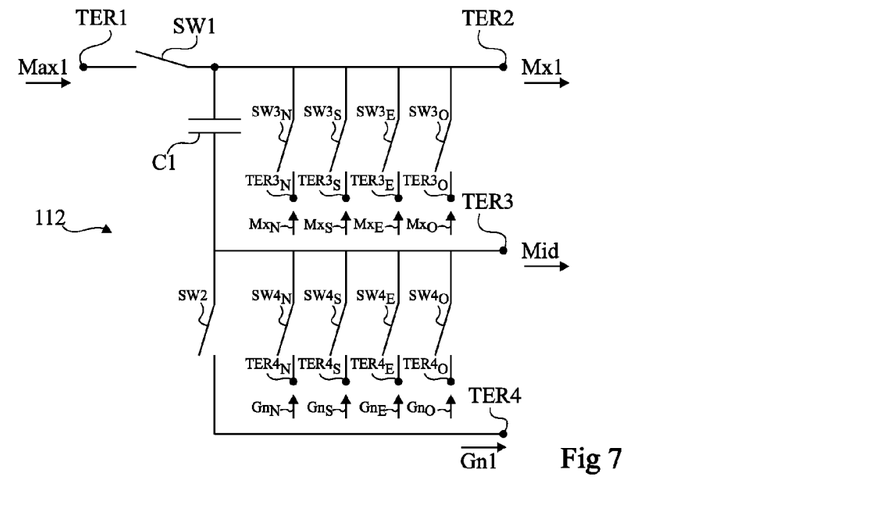

FIG. 7 shows an embodiment of a portion of correction circuit 52 corresponding to a circuit 112 outputting signals Mx1 and Mid capable of being used to carry out steps 104, 108, or 110 of the embodiment of the correction method previously described in relation with FIG. 6.

Circuit 112 comprises a terminal TER1 receiving signal Max1. A switch SW1 is provided between input terminal TER1 and a terminal TER2 outputting signal Mx1. A capacitor C1 is arranged between terminal TER1 and a terminal TER3 outputting signal Mid. A switch SW2 is arranged between terminal TER3 and a terminal TER4 outputting signal Gn1. The capacitance of capacitor C1 is for example in the order of 1 pF.

Switches $SW3_N$, $SW3_S$, $SW3_E$, $SW3_O$ connect terminal TER2 respectively to terminals $TER3_N$, $TER3_S$, $TER3_E$, and $TER3_O$, which respectively receive signals $Mx_N$, $Mx_S$, $Mx_E$, and $Mx_O$. Switches $SW4_N$, $SW4_S$, $SW4_E$, $SW4_O$ connect terminal TER3 respectively to terminals $TER4_N$, $TER4_S$, $TER4_E$, and $TER4_O$, which respectively receive signals $Gn_N$, $Gn_S$, $Gn_E$, and $Gn_O$.

Each terminal $TER3_k$, where k is equal to N, S, E or O, of the central correction circuit is permanently connected to terminal TER3 of the considered adjacent correction circuit and terminal TER3 of the central correction circuit is permanently connected to terminals $TER3_N$, $TER3_S$, $TER3_E$, and $TER3_O$ of the adjacent correction circuits. Each terminal $TER4_k$, k being equal to N, S, E or O, of the central correction circuit is permanently connected to terminal TER4 of the considered adjacent correction circuit, and terminal TER4 of the central correction circuit is permanently connected to terminals $TER4_N$, $TER4_S$, $TER4_E$, and $TER4_O$ of the adjacent correction circuits.

In operation, when switches SW1 and SW2 are on, voltage Max1 is applied across capacitor C1 and signal Mx1 follows signal Max1. When switch SW1 is off, signal Max1 is sampled and the sampled voltage is maintained across capacitor C1. When the sampling is performed at the maximum value of voltage Max1, the voltage across capacitor C1 is representative of the energy of the photon detected by the central correction circuit.

Figure 8:
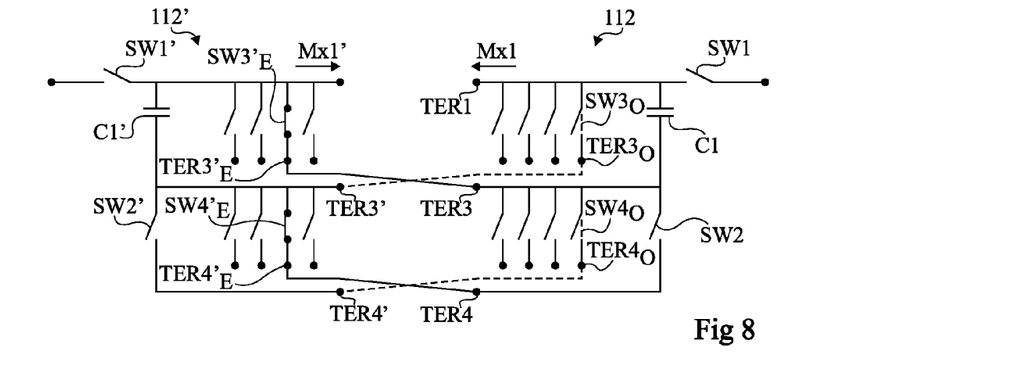
FIG. 8 illustrates an example of connection between the correction circuits of two adjacent read circuits.

FIG. 8 illustrates two examples of configurations of the switches of circuit 112 capable of being used at previously-described steps 108 and 110 when the central correction circuit and the adjacent correction circuit located East thereof participate in the detection overlap. Symbol ' is added to the references of the elements of the correction circuit located on the east side to tell them from the central correction circuit.

So that the central correction circuit can output a signal Mx1 equal to the sum of the voltages across capacitors C1 and C1' (full line), switch $SW3_E$' is turned on and switch $SW4_E$' is turned on, the other switches remaining off. So that the adjacent correction circuit located on the east side of the central correction circuit can output a signal Mx1' equal to the sum of the voltages across capacitors C1 and C1' (dotted line), switch $SW3_O$ is turned on and switch $SW4_E$ is turned on, the other switches remaining off.

According to an embodiment of the invention, the central correction circuit further receives a signal $M_k$ from each adjacent correction circuit and supplies each adjacent correction circuit with a signal $M1_k$. Signals $M_k$ and $M1_k$ are binary signals.

Figure 9:
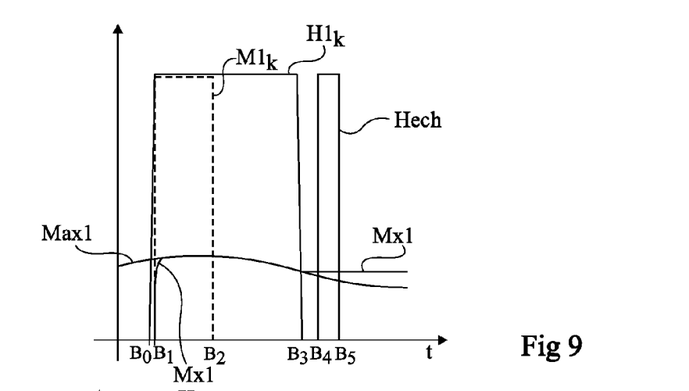
FIG. 9 shows an example of timing diagrams of signals output by a correction circuit on detection of a photon.

FIG. 9 shows timing diagrams of signals $H1_k$ (or H1), Hech, $M1_k$, Max1, and Mx1 output by the central correction circuit in the absence of overlap, where k is equal to N, S, E, or O. Times $B_0$ to $B_5$ are successive times.

Signal $H1_k$ is a binary signal which starts on its leading edge at time $B_0$ and ends on its trailing edge at time $B_3$. In the example shown in FIG. 9, the leading edge of signal $H1_k$ is a rising edge and the trailing edge of signal $H1_k$ is a falling edge.

Correction circuit 52 supplies each adjacent correction circuit with a signal $M1_k$, where k may be equal to N, S, E, or O. Signal $M1_k$ is a binary signal having its leading edge occurring at time $B_1$ which immediately follows time $B_0$. In the following description, it is considered that the leading edge of signal $M1_k$ substantially overlaps the leading edge of signal $H1_k$. Signal $M1_k$ ends at on its trailing edge at time $B_2$. The period between times $B_0$ and $B_2$ is constant, for example, in the order of 8 ns.

Signal Max1 is shown in FIG. 9 in sinusoidal form to better tell the different phases from one another. Switch SW1 is turned on at time $B_0$ and turned off at time $B_3$. Signal Mx1 thus follows signal Max1 between times $B_0$ and $B_3$ and is then maintained at the value of Max1 sampled at time $B_3$.

Signal Hech is a binary signal which starts on its leading edge at time $B_4$ and ends on its trailing edge at time $B_5$. In the absence of overlap, the leading edge of signal Hech may immediately follow the falling edge of signal $H1_k$. In this case, times $B_3$ and $B_4$ are almost confounded.

Figure 10:
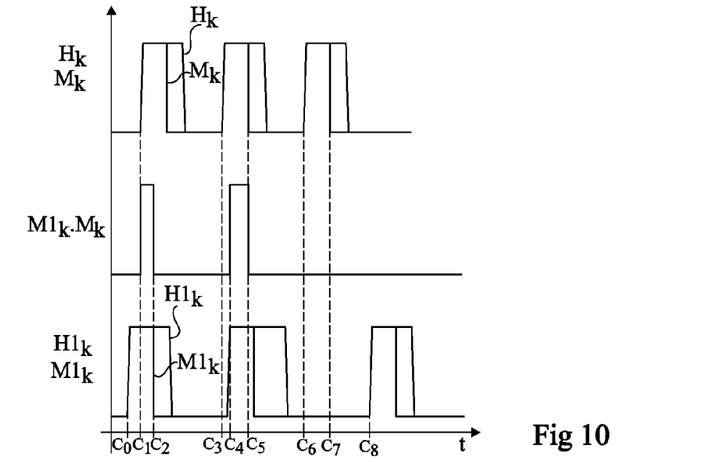
FIG. 10 shows examples of timing diagrams illustrating an embodiment of a method for determining whether a photon detection overlap is occurring.

FIG. 10 illustrates in further detail an embodiment of steps 102 and 106 of the embodiment of the correction method previously described in relation with FIG. 6.

Times $C_0$ to $C_8$ are successive times. The lower portion of FIG. 10 shows signals $H1_k$ and $M1_k$, k being equal to N, S, E, or O, supplied by the central correction circuit to the adjacent correction circuits and the upper portion of FIG. 10 shows signals $H_k$ and $M_k$ supplied by one of the adjacent correction circuits to the central correction circuit. To determine whether a detection overlap has occurred, the central correction circuit determines the product of signals $M1_k$ and $M_k$ shown in the central portion of FIG. 10. FIG. 10 illustrates three cases.

The first case (times $C_0$ to $C_2$) corresponds to a detection overlap, the ionizing radiation detection first occurring in the central pixel. The leading edges of signals $H1_k$ and $M1_k$ occur at time $C_0$. The leading edges of signals $H_k$ and $M_k$ occur at time $C_1$ preceding time $C_2$ of the trailing edge of signal $M1_k$. The central correction circuit determines that a detection overlap is occurring based on the fact that the product between signals $M_k$ and $M1_k$ is not zero between times $C_1$ and $C_2$. The central correction circuit determines that the ionizing radiation detection occurs first in the central pixel from the fact that the rising edge of signal $M1_k$ occurs before the rising edge of signal $M_k$.

The second case (times $C_3$ to $C_5$) corresponds to the presence of a detection overlap, the ionizing radiation detection first occurring in the adjacent pixel. The leading edges of signals $H_k$ and $M_k$ occur at time $C_3$. The leading edges of signals $H1_k$ and $M1_k$ occur at time $C_4$ preceding time $C_5$ of the trailing edge of signal $M_k$. The central correction circuit determines that a detection overlap is occurring based on the fact that the product between signals $M_k$ and $M1_k$ is not zero between times C4 and C5. The central correction circuit determines that the ionizing radiation detection occurs first in the adjacent pixel from the fact that the rising edge of signal $H_k$ occurs before the rising edge of signal $H1_k$.

The third case (times $C_6$ to $C_8$) corresponds to no detection overlap. The leading edges of signals $H_k$ and $M_k$ occur at time C6. The trailing edges of signal $M_k$ occur at time $C_7$ preceding time $C_8$ of the leading edges of signals $H1_k$ and $M1_k$. The central correction circuit determines that a detection overlap is not occurring based on the fact that the product between signals $M_k$ and $M1_k$ is zero.

According to an embodiment of the invention, the central correction circuit takes into account a single detection overlap, called priority detection overlap. According to an embodiment of the invention, if two or more than two detection overlaps occur, among which at least one for which signal $H_k$ switches from state '1' after the switching to state '1' of signal H1, the priority detection overlap is the detection overlap with the adjacent correction circuit for which signal $H_k$ switches first to state '1' after the switching to state '1' of signal H1. According to an embodiment of the invention, if, for all detection overlaps, signal $H_k$ switches to state '1' before the switching to state '1' of signal H1, the priority detection overlap is the detection overlap with the adjacent correction circuit for which signal $H_k$ switches first to state '1' before the switching to state '1' of signal H1.

Figure 11:
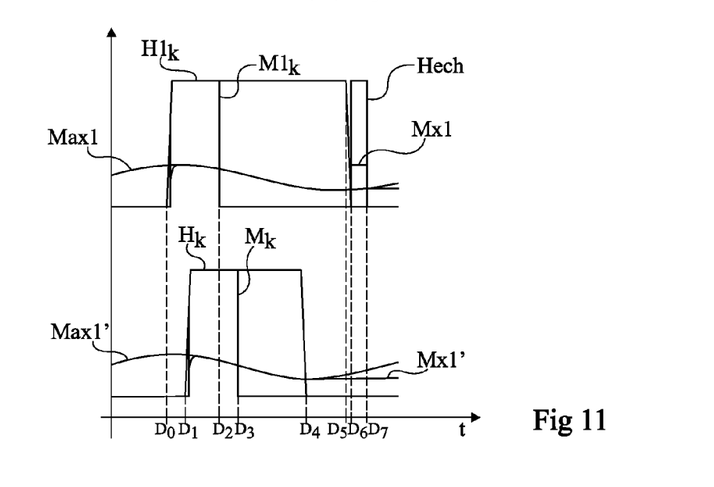
FIGS. 11 and 12 show examples of timing diagrams of signals output by two adjacent pixel correction circuits during a detection overlap; and (l)
Figure 12:
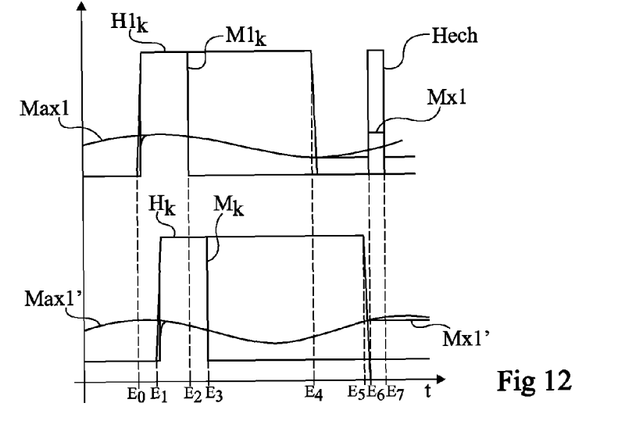

FIGS. 11 and 12 illustrate a more detailed embodiment of steps 102, 106, and 108 of the method previously described in relation with FIG. 6, each correction circuit 52 comprising circuit 112 previously described in relation with FIGS. 7 and 8.

FIGS. 11 and 12 each show, in their upper portion, timing diagrams of signals received and output by the central correction circuit and, in their lower portion, timing diagrams of signals received and output by an adjacent correction circuit in the case of a detection overlap. Signal Max1' corresponds to signal Max1 received by the adjacent correction circuit and signal Mx1' corresponds to signal Mx1 output by the adjacent correction circuit. Times $D_0$ to $D_7$ and times $E_0$ to $E_7$ are successive times.

FIG. 11 illustrates an example of detection overlaps (assumed to hold the priority) where the trailing edge of signal $H_k$ precedes the trailing edge of signal $H1_k$.

The leading edges of signals $H1_k$ and $M1_k$ occur at time $D_0$. The leading edges of signals $H_k$ and $M_k$ occur at time $D_1$ preceding time $D_2$ of the trailing edge of signal $M1_k$. The central correction circuit thus determines that a detection overlap is occurring based on the fact that the product between signals $M_k$ and $M1_k$ is not zero between times $D_1$ and $D_2$. Further, the central correction circuit determines that the ionizing radiation detection occurs first in the central pixel from the fact that the rising edge of signal $M1_k$ occurs before the rising edge of signal $M_k$. Time $D_3$ corresponds to the trailing edge of signal $M_k$ and time $D_4$ corresponds to the trailing edge of signal $H_k$. Switch SW1 of the adjacent correction circuit is turned on at time $D_1$ and turned off at time $D_4$. After time $D_4$, signal Mx1' is substantially constant and corresponds to the value of signal Max1' sampled at time $D_4$. At time $D_5$, the trailing edge of signal $H1_k$ occurs. Switch SW1 of the central correction circuit is turned on at time $D_0$ and turned off at time $D_5$.

After time $D_5$, signals $H1_k$ and $H_k$ being at the low level, central correction circuit sets signal Hech to the high state at time $D_6$ immediately after the trailing edge of signal $H1_k$. The trailing edge of signal Hech occurs at time $D_7$. Switches $SW3_k$ and $SW4_k$ of the adjacent correction circuit are on between times $D_6$ and $D_7$. Between times $D_6$ and $D_7$, signal Mx1 corresponds to the value of signal Max1 sampled at time $D_5$ increased by signal Mx1', which corresponds to the value of signal Max1' sampled at time $D_4$. The adjacent correction circuit outputs no signal Hech so that only the detection of an ionizing radiation by the central correction circuit is taken into account by central processing unit 24.

FIG. 12 illustrates an example of a detection overlap (assumed to hold the priority) where the trailing edge of signal $H1_k$ precedes the trailing edge of signal $H_k$. The signals vary in the same way between times $E_0$ and $E_3$ as between times $D_0$ and $D_3$. At time $E_4$, the trailing edge of signal $H1_k$ occurs. Switch SW1 of the central correction circuit is turned on at time $E_0$ and turned off at time $E_4$. At time $E_5$, the trailing edge of signal $H_k$ occurs. Switch SW1 of the adjacent correction circuit is turned on at time $E_1$ and turned off at time $E_5$. After time $E_5$, signal Mx1' is substantially constant and corresponds to the value of signal Max1' sampled at time $E_5$.

After time $E_5$, signals $H1_k$ and $H_k$ being at the low level, central correction circuit sets signal Hech to the high state at time $E_6$ immediately after the trailing edge of signal $H_k$. The trailing edge of signal Hech occurs at time $E_7$. Switches $SW3_k$ and $SW4_k$ of the adjacent correction circuit are on between times $E_6$ and $E_7$. Between times $E_6$ and $E_7$, signal Mx1 corresponds to the value of signal Max1 sampled at time $E_4$ increased by signal Mx1', which corresponds to the value of signal Max1' sampled at time $E_5$. The adjacent correction circuit outputs no signal Hech so that only the detection of an ionizing radiation by the central correction circuit is taken into account by central processing unit 24.

Figure 13:
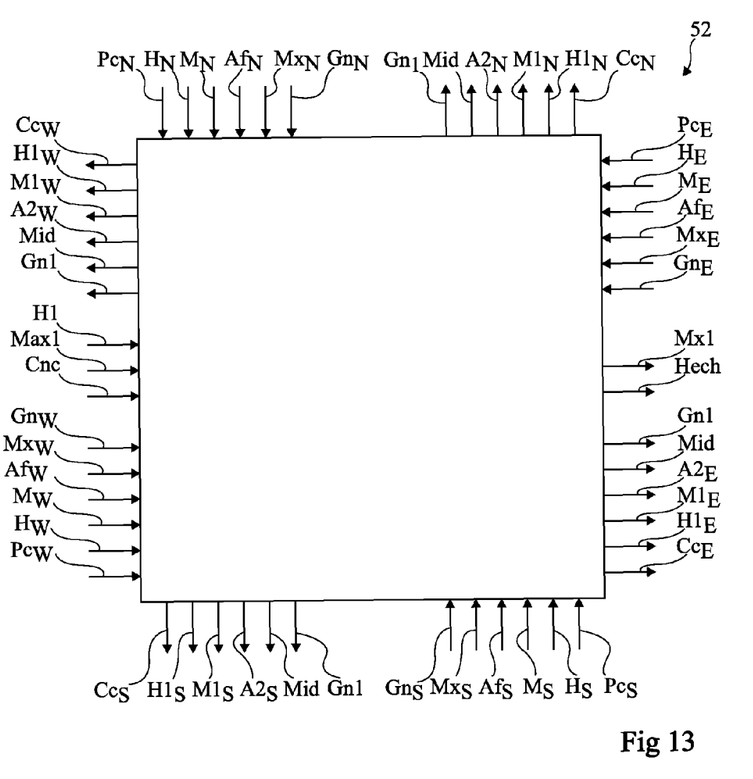
FIG. 13 illustrates the signals transmitted and received by an embodiment of the correction circuit.

FIG. 13 schematically shows the signals received and output according to an embodiment of correction circuit 52 where the correction circuit further receives a signal Cnc from processing unit 24 and signals $Pc_k$ and $Af_k$ from each adjacent correction circuit and supplies each adjacent correction circuit with signals $Cc_k$ and $A2_k$.

Signal Cnc is a binary signal which corresponds to a control bit of each correction circuit 52. As an example, when signal Cnc is in the high state, a correction method is implemented to take into account charge sharing phenomena according to one of the previously-described embodiments of the invention. As an example, when signal Cnc is in the low state, no correction method is implemented to take into account charge sharing phenomena.

Signals $Af_k$, $Pc_k$, $A2_k$, and $Cc_k$ are used to implement a communication protocol between the central correction circuit and the adjacent correction circuits at steps 102, 106, 108, and 110 previously described in relation with FIG. 6.

When, at steps 102 and 106, the central correction circuit determines that a priority detection overlap has occurred with one of the adjacent circuits, for example, the adjacent circuit located on the east side, and that the central correction circuit is the first one to have detected the ionizing radiation, it sets signal $Cc_E$ to '1', the other signals $Cc_N$, $Cc_S$, and $Cc_O$ being maintained at '0'. The setting to '1' of signal $Cc_E$ may be performed at the falling edge of signal $M1_E$. If available, the adjacent correction circuit located on the east side sets signal $Pc_E$ to '1', for example, at the trailing edge of signal $M_E$. The adjacent correction circuit located on the east side then turns off switches $SW3_E$ and $SW4_E$ and the central correction circuit waits for the last trailing edge between the trailing edge of signal $M_E$ and of signal $H_E$ to set signal Hech to '1' and add signals Mx1 and $Mx_E$ (step 108). If it is not available, the adjacent correction circuit located on the east side maintains signal $Pc_E$ at '0' and maintains switches $SW3_E$ and $SW4_E$ off. Everything occurs as if there was no detection overlap (step 104) and the central correction circuit then sets signal Hech to '1' after the trailing edge of signal $H1_E$ and $H_E$. There thus is no addition of signals Mx1 and $Mx_E$ while signal Hech is at '1'. The adjacent correction circuit may be unavailable if it already takes part in a priority detection overlap with another correction circuit.

One of the adjacent correction circuits, for example, the adjacent correction circuit located to the east, may determine that a priority detection overlap has occurred with the central correction circuit and that the adjacent correction circuit is the first one to have detected the ionizing radiation. The adjacent correction circuit can then transmit to the central correction circuit a request to recover signal Mx1 of the central correction circuit. The adjacent correction circuit, for example, located on the east side, then sets signal $Af_E$ to '1', the other signals $Af_N$, $Af_S$, and $Af_O$ being maintained at '0'. The setting to '1' of signal $Af_E$ may be performed at the falling edge of signal $M_E$. If, at steps 102 and 106, the central correction circuit has also determined that a detection overlap has occurred with the adjacent circuit on the east side, the central correction circuit sets signal $A2_E$ to '1', for example, at the trailing edge of signal $M1_E$. The central correction circuit then turns on switches $SW3_E$ and $SW4_E$ so that the adjacent correction circuit on the east side can read the voltage across capacitor C1 of the central correction circuit via signal Mid. If the central correction circuit is not available, the central correction circuit maintains signal $A2_E$ at '0' and maintains switches $SW3_E$ and $SW4_E$ off. The central correction circuit may be unavailable if it already takes part in a priority detection overlap with another correction circuit.

Specific embodiments of the present invention have been described. Various alterations and modifications will occur to those skilled in the art. In particular, although embodiments have been described where each central correction circuit exchanges signals with four other adjacent correction circuits (except for the correction circuits associated with electrodes at the edges of the electrode array), it should be clear that each central correction circuit may be connected to a larger or smaller number of adjacent correction circuits. As an example, in relation with FIG. 5, the central correction circuit may be connected to eight adjacent correction circuits associated with the electrodes located to the north, to the south, to the east, to the west, to the north-east, to the north-west, to the south-east, and to the south-west of the central electrode.

The invention claimed is:

1. A device for detecting an ionizing radiation comprising a sensor wherein the ionizing radiation causes the forming of charges, the sensor being covered with a plurality of electrodes, each connected to an electronic circuit configured to supply a processing unit with a first signal indicating that charges are being collected by the electrode connected to said electronic circuit;

wherein at least one electrode, called central electrode, is surrounded with at least two electrodes, called adjacent electrodes, the circuit connected to the central electrode, called central circuit, configured to exchange signals with each of the circuits connected to the adjacent electrodes, called adjacent circuits;

wherein each central or adjacent circuit is configured to respectively send to the adjacent or central circuit a second detection signal when charges are being respectively collected on the central electrode or an adjacent electrode;

wherein each central or adjacent circuit is configured to respectively send to the adjacent or central circuit a request to participate in a detection overlap and respectively receiving from the adjacent or central circuit an availability indication;

wherein each central circuit comprises an analysis and control device is configured to, when the central electrode has collected charges:

(a) determine, within a time range, a possible detection overlap between the central electrode and at least one of the adjacent electrodes based on the detection signals;

(b) in the case of a detection overlap, determine a first priority detection overlap with an adjacent circuit, called priority circuit, for which the second detection signals of the priority adjacent circuit and of the central circuit have the highest probability of corresponding to a same received photon;

(c) transmit to or receive from the priority adjacent circuit a request to participate in a detection overlap and receive from or transmit to the priority adjacent circuit an availability indication; and (d) transmit said first signal to the processing unit except in the case where a detection overlap has been determined within said time range and where an availability indication has been sent to the priority adjacent circuit.

2. The device of claim 1, wherein each circuit is configured to transmit to the processing unit a third signal representative of the energy of the ionizing radiation having caused the forming of the charges collected by the electrode connected to said circuit, wherein the analysis and control device of each central circuit is configured to supply the processing unit, if said priority adjacent circuit accepts the participation request, with the third signal from the central circuit increased by the third signal from the priority adjacent circuit.

3. The device of claim 2, wherein the analysis and control device of each central circuit is configured to transmit to the priority adjacent circuit the third signal from the central circuit when an availability indication has been sent to the priority adjacent circuit.

4. The device of claim 1, wherein at least some central electrodes are each surrounded with at least four adjacent electrodes.

5. The device of claim 1, wherein each electronic circuit is output a fourth analog signal which transits through an extremum when charges are collected by the electrode connected to said electronic circuit, the second signal being different from the first signal and being a binary signal which switches state when the fourth signal is greater, in absolute value, than a threshold.

6. The device of claim 5, wherein each electronic circuit is configured to output the first signal, which has a leading edge subsequent to the trailing edge of the second signal.

7. The device of claim 5, wherein the analysis and control device of each central circuit is configured to determine the priority adjacent circuit which is that of the adjacent circuits connected to adjacent electrodes having collected charges within said time range which outputs the second signal having its leading edge most closely following the leading edge of the second signal output by the central circuit.

8. The device of claim 1, wherein each electronic circuit is configured to output a fifth binary signal of constant duration, different from the first signal and from the second signal, indicating that charges are being collected by the electrode connected to said electronic circuit, each central circuit being configured to transmit, to each adjacent circuit, the fifth signal output by the central circuit and of receiving, from each adjacent circuit, the fifth signal output by each adjacent circuit.

9. The device of claim 8, wherein the central circuit is configured to determine whether the logical product of the fifth signal output by the central circuit and of the fifth signal output by each adjacent circuit changes value.

10. The device of claim 9, wherein each electronic circuit is configured to output the fifth signal having its leading edge overlapping the leading edge of the second signal.

11. The device of claim 1, wherein the electronic circuits are identical.

12. The device of claim 1, wherein the analysis and control device of each central circuit is configured to, when the central electrode has collected charges, determine at least two priority adjacent circuits.

13. A method of detecting an ionizing radiation wherein the ionizing radiation causes the forming of charges in a sensor, the sensor being covered with a plurality of electrodes, each connected to an electronic circuit configured to supply a processing unit with a first signal indicating that charges are collected by the electrode connected to said electronic circuit, each central circuit comprising an analysis and control device;

wherein at least one electrode, called central electrode, is surrounded with at least two electrodes, called adjacent electrodes, the circuit connected to the central electrode, called central circuit, being configured to exchange signals with each of the circuits connected to the adjacent electrodes, called adjacent circuits;

wherein each central or adjacent circuit is configured to respectively send to the adjacent or central circuit a second detection signal when charges are respectively collected on the central electrode or an adjacent electrode;

wherein each central or adjacent circuit is configured to respectively send to the adjacent or central circuit a request to participate in a detection overlap and respectively receive from the adjacent or central circuit an availability indication;

the method comprising, for the analysis and control device of each central circuit, when the central electrode has collected charges, the steps of:

(a) determining, within a time range, a possible detection overlap between the central electrode and at least one of the adjacent electrodes based on the detection signals;

(b) in the case of a detection overlap, determining a first priority detection overlap with an adjacent circuit, called priority circuit, for which the second detection signals of the priority adjacent circuit and of the central circuit have the highest probability of corresponding to a same received photon;

(c) transmitting to or receiving from the priority adjacent circuit a request to participate in a detection overlap and receiving from or transmitting to the priority adjacent circuit an availability indication; and (d) transmitting said first signal to the processing unit except in the case where a detection overlap has been determined in said time range and where an availability indication has been sent to the priority adjacent circuit.

* * * * *